(12) United States Patent
Burlatsky et al.

(10) Patent No.: US 7,473,485 B2
(45) Date of Patent: Jan. 6, 2009

(54) EXTENDED ELECTRODES FOR PEM FUEL CELL APPLICATIONS

(75) Inventors: Sergei F. Burlatsky, Vernon, CT (US); Jared B Hertzberg, Hyattsville, MD (US); Ned E. Cipollini, Enfield, CT (US); David A. Condit, Avon, CT (US); Thomas D. Jarvi, Manchester, CT (US); James A. Leistra, West Granby, CT (US); Michael L. Perry, South Glastonbury, CT (US); Thomas H. Madden, Glastonbury, CT (US)

(73) Assignee: UTC Power Corporation, South Windsor, CT (US)

( * ) Notice: Subject to any disclaimer, the term of this patent is extended or adjusted under 35 U.S.C. 154(b) by 229 days.

(21) Appl. No.: 10/867,305

(22) Filed: Jun. 14, 2004

(65) Prior Publication Data
US 2004/0224216 A1    Nov. 11, 2004

Related U.S. Application Data

(63) Continuation-in-part of application No. 10/235,074, filed on Sep. 4, 2002, now Pat. No. 7,112,386, and a continuation-in-part of application No. 10/795,181, filed on Mar. 4, 2004.

(51) Int. Cl.
*H01M 4/86* (2006.01)
*H01M 4/90* (2006.01)

(52) U.S. Cl. .............................. 429/40; 429/30; 429/42

(58) Field of Classification Search .................. 429/30, 429/40–44; 502/101
See application file for complete search history.

(56) References Cited

U.S. PATENT DOCUMENTS

| 4,438,216 | A | | 3/1984 | Kampe et al. |
| 5,342,494 | A | | 8/1994 | Shane et al. |
| 5,472,799 | A | | 12/1995 | Watanabe |
| 5,480,518 | A | | 1/1996 | Shane et al. |
| 5,523,181 | A | | 6/1996 | Stonehart et al. |
| 5,672,439 | A | | 9/1997 | Wilkinson et al. |
| 5,766,787 | A | | 6/1998 | Watanabe et al. |
| 5,795,669 | A | | 8/1998 | Wilkinson et al. |
| 5,800,938 | A | | 9/1998 | Watanabe |
| 5,874,182 | A | | 2/1999 | Wilkinson et al. |
| 5,981,097 | A | * | 11/1999 | Rajendran ................... 429/33 |
| 6,242,135 | B1 | | 6/2001 | Mushiake |
| 6,300,000 | B1 | | 10/2001 | Cavalca et al. |
| 6,309,769 | B1 | | 10/2001 | Haug |

(Continued)

FOREIGN PATENT DOCUMENTS

AU             1 013 703       12/1965

(Continued)

*Primary Examiner*—Tracy Dove
(74) *Attorney, Agent, or Firm*—Bachman & LaPointe, P.C.

(57) ABSTRACT

A membrane electrode assembly includes an anode; a cathode; a membrane disposed between the anode and the cathode; and an extended catalyzed layer between the membrane and at least one electrode of the anode and the cathode. The extended catalyzed layer includes catalyst particles embedded in membrane material and preferably includes a first plurality of particles which are electrically connected to the at least one electrode. The extended catalyzed layer may further preferably have a second plurality of particles which are electrically disconnected from the at least one electrode.

15 Claims, 5 Drawing Sheets

U.S. PATENT DOCUMENTS

| | | |
|---|---|---|
| 6,335,112 B1 | 1/2002 | Asukabe et al. |
| 6,485,855 B1 | 11/2002 | Fukuda et al. |
| 2003/0008196 A1 | 1/2003 | Wessel et al. |
| 2003/0059664 A1 | 3/2003 | Menjak et al. |

FOREIGN PATENT DOCUMENTS

| | | |
|---|---|---|
| EP | 0 309 337 | 3/1989 |
| EP | 1 298 751 | 4/2003 |
| JP | 2001-118591 | 4/2001 |

\* cited by examiner

EXTENDED ELECTRODES FOR PEM FUEL CELL APPLICATIONS

CROSS-REFERENCE TO RELATED APPLICATIONS

This application is a continuation-in-part of U.S. patent application Ser. No. 10/235,074 filed Sep. 4, 2002 now U.S. Pat. No. 7,112,386 and is a continuation-in-part of U.S. patent application Ser. No. 10/795,181, filed Mar. 4, 2004.

BACKGROUND OF THE INVENTION

The invention relates to fuel cells and, more particularly, to PEM fuel cells and reduction in degradation of ionomer, for example in the membrane and electrodes of same.

In a PEM fuel cell, a small amount of oxygen diffuses from the cathode to the anode through the membrane and can form peroxide by reacting with hydrogen ions at low potential at the anode catalyst membrane interface. In addition, oxygen added to the fuel for carbon monoxide tolerance can form peroxide in the anode. This peroxide can dissociate into highly reactive free radicals. These free radicals can rapidly degrade the ionomer in the membrane and electrodes.

It is desired to achieve 40,000-70,000 hour and 5,000-10,000 hour lifetimes for stationary and transportation PEM fuel cells, respectively. Free radical degradation of the ionomer seriously interferes with efforts to reach these goals.

While numerous sources of oxygen, hydrogen and/or peroxide can contribute to this problem, it is hydrogen crossing over from the anode, oxygen crossing over from the cathode, oxygen in the fuel stream, and hydrogen peroxide generated by the same that is the focus of the present invention.

It is a primary object of the present invention to minimize degradation caused by such sources of reactive free radicals.

It is a further object of the present invention to provide a membrane electrode assembly having an extended lifetime due to such reduction of crossover gases, enhanced peroxide decomposition, and reduced degradation from peroxide generated.

Other objects and advantages of the present invention will appear herein below.

SUMMARY OF THE INVENTION

In accordance with the present invention, the foregoing objects and advantages have been readily attained.

According to this invention, a membrane electrode assembly has been provided which comprises an anode; a cathode; a membrane disposed between the anode and the cathode; and an extended catalyzed layer between the membrane and at least one electrode of the anode and the cathode. The extended catalyzed layer advantageously comprises catalyst particles embedded in ion-exchange material, and may include a first plurality of particles which are electrically connected to a high degree to the at least one electrode, and may include a second plurality of particles which are electrically connected to a lesser degree to the at least one electrode.

On the anode side, the connected particles of the extended catalyzed layer advantageously serve to consume hydrogen at the anode potential and prevent crossover of hydrogen to the membrane and/or cathode, while the disconnected particles are at a potential set by gas composition and concentration at that location, which is well-suited for benign decomposition of peroxide.

In accordance with a further aspect of the invention, excellent results are obtained by providing a first extended catalyzed layer, or extended anode layer, between the anode and the membrane, and a second extended catalyzed layer, or extended cathode layer, between the cathode and the membrane. In this embodiment, it is preferred that the extended anode have a greater amount of disconnected catalyst particles than the cathode.

BRIEF DESCRIPTION OF THE DRAWINGS

A detailed description of preferred embodiments of the present invention follows, with reference to the attached drawings, wherein.

DETAILED DESCRIPTION

The invention relates to fuel cells, especially to polymer electrolyte membrane (PEM) fuel cells, and more specifically to reduction of oxygen and hydrogen crossover from the cathode and anode, respectively, through positioning of an extended catalyzed layer between the membrane and either or both of the anode and cathode which consumes these gases before penetrating the membrane and thereby avoids production of hydrogen peroxide.

According to the invention, an extended catalyzed layer is positioned between the membrane and at least one of the anode or cathode of the membrane electrode assembly. The extended catalyzed layer advantageously serves to prevent crossover of oxygen and/or hydrogen, reduce the chance for formation of peroxide, and/or provide for benign decomposition of peroxide, all of which serves to increase the useful lifetime of the membrane electrode assembly by preventing peroxide generated radicals from attacking the ionomer of the membrane and electrodes.

Membrane electrode assemblies such as that which are the subject of the present invention are disclosed in co-pending and commonly owned U.S patent application Ser. No. 10/235,074, filed Sep. 4, 2002, and published as publication no. U.S.-2004-0043283 on Mar. 4, 2004, which is incorporated herein by reference.

According to the invention, it has been found that an extended catalyzed layer can be positioned between the membrane and either or both of the electrodes so as to reduce crossover of the oxygen and/or hydrogen and also to decompose any peroxide which is formed, thereby preventing attack on the ionomer of the membrane and electrodes. This attack on the ionomer material is referred to hereafter as attack on the membrane, and should be understood as meaning attack on the membrane material, or ionomer, and also on this ionomer as is present in the electrodes. The extended catalyzed layer in accordance with the present invention is a layer of catalyst particles dispersed through or embedded in ion-exchange polymer material as will be further discussed below.

Figure 1:
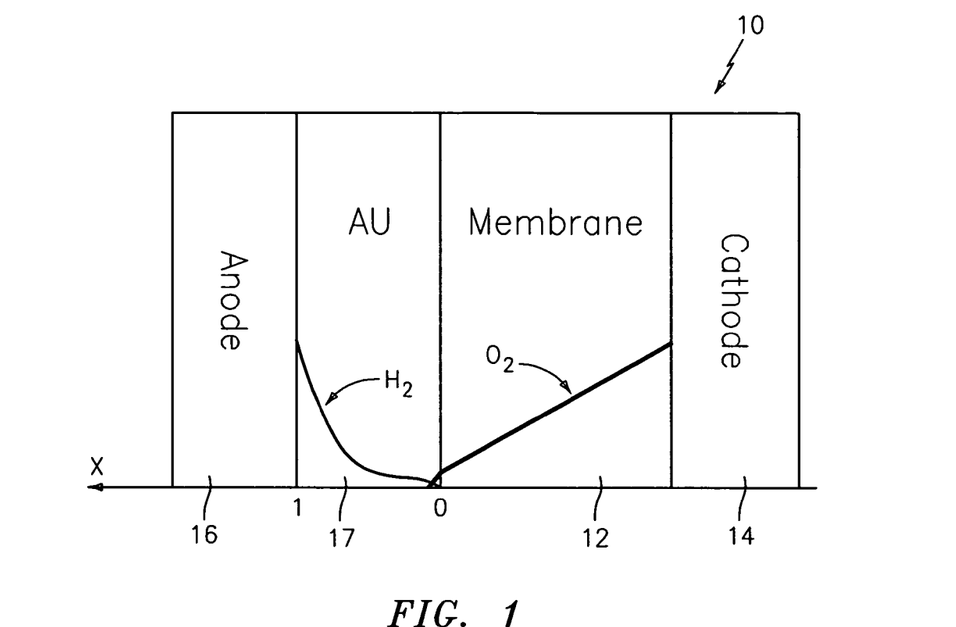
FIG. 1 illustrates a membrane electrode assembly in accordance with the present invention having an extended catalyzed layer between the anode and the membrane.

Turning to FIG. 1, a membrane electrode assembly 10 is illustrated in accordance with the present invention and includes a membrane 12, a cathode 14 and an anode 16. Membrane 12 is positioned between cathode 14 and anode 16 and serves to provide function of a fuel cell electrolyte and separate oxygen from hydrogen as is well known to persons of ordinary skill in the art. In the course of such operation, hydrogen diffuses through anode 16 into and through membrane 12, and oxygen diffuses through cathode 14 and into and through membrane 12 and these components can form peroxide, predominantly at the anode. The hydrogen and oxygen flux, expressed in terms of current density, are substantially the same as crossover current, which is typically 2-4 $mA/cm^2$ depending upon membrane thickness.

Still referring to FIG. 1, in this embodiment an extended catalyzed layer is provided in the form of an extended anode 17 positioned between membrane 12 and anode 16. Extended anode 17 is a layer of particulate catalyst material which is embedded in a matrix which contains ion-exchange or ion-conducting material.

Suitable catalyst particles for extended catalyzed layers include particles of Pt, Pd, Ir, C, Ag, Au, Rh, Ru, Sn, Si, Ti, Zr, Al, Hf, Ta, Nb, Ce and combinations thereof including oxides where applicable, more preferably Pt, Pd, Ir, C, Ag, Au, Rh, Ru and combinations thereof, including oxides where applicable.

Such catalysts are further preferably provided on a support which may advantageously be selected from the group consisting of oxides of Ru, Sn, Si, Ti, Zr, Al, Hf, Ta, Nb and Ce, as well as zeolites, carbon and mixtures thereof. Particles of platinum, platinum supported on carbon, carbon itself, platinum alloys such as platinum-cobalt alloys, platinum-nickel alloys and the like, are particularly preferred. In addition to alloys, various phase segregated metals and metals on supports can also be used within the broad scope of the present invention. The catalyst is selected to have activity toward hydrogen oxidation and oxygen reduction reactions which can be used to protect membrane 12 from peroxide attack. Such catalyst can also typically be the same catalyst positioned in the respective electrode from which the extended catalyzed layer extends. In some situations, it may be desirable to select or modify the above catalyst particles in a way that renders the extended catalyzed layers hydrophilic.

According to the invention, it has been found beneficial to have catalyst particles in extended anode 17 including a first portion which are electrically connected to the anode and a second portion which are not electrically connected to the anode. The first portion of particles are at nearly the same potential as anode 16 due to electrical connection therewith. These electrically connected particles are well suited to breaking down hydrogen crossing from anode 16 into the extended anode 17, and thereby preventing this hydrogen from reaching the membrane and/or oxygen diffusing through the membrane. The second portion of particles which are not electrically connected to anode 16 have a potential which increases with decreasing $H_2$ concentration and with increasing $O_2$ concentration in extended anode 17. Therefore, the potential is lower near the interface between anode 16 and extended anode 17 than it is near the interface between extended anode 17 and membrane 12. Catalyst particles at the proper potential are active toward benign decomposition of peroxide. Providing electrically disconnected particles in extended anode 17 provides for catalyst particles at the appropriate potential and location to facilitate benign decomposition of peroxide, thereby extending lifetime of membrane 12.

Figure 1A:
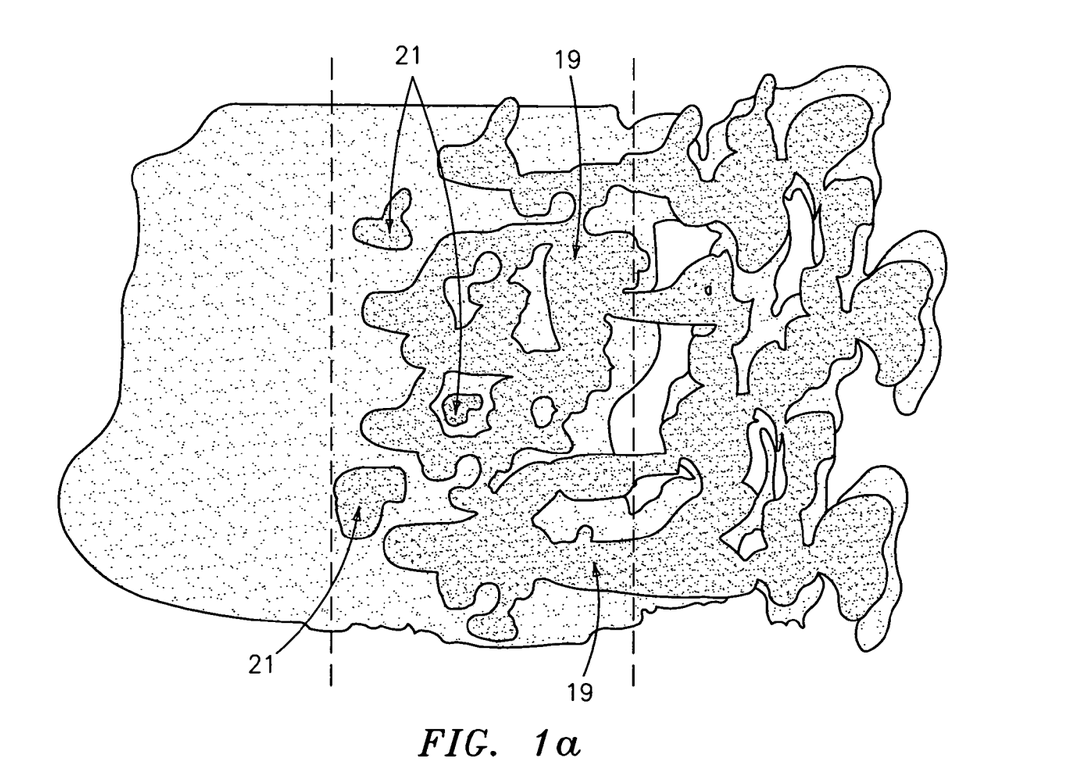

FIG. 1a shows a portion of an extended catalyzed layer including a plurality of connected particles 19 and disconnected particles 21. As used herein, particles are considered electrically connected to an electrode if they are directly or indirectly in contact with same. This can occur through many interconnected particles. As used herein, particles are considered disconnected if they are not directly or indirectly in contact with the electrode. It is entirely possible or probable that disconnected particles 21 can be in contact with each other, for example in aggregates or clumps, but these clumps are not themselves connected to the electrode.

When the fuel cell including assembly 10 is on-load, the connected particles of extended anode 17 by virtue of electrical connection are at the same potential as anode 16. The hydrogen oxidation reaction therefore occurs at a rate as provided for by the diffusion rate into extended anode 17. Porosity of extended anode 17 is reduced by at least a factor of as compared to a typical fuel cell electrode (~50% to <5%) during fabrication by filling with ion-exchange polymer. Remaining porosity of extended anode 17 is flooded by water which back-diffuses from cathode 14 while on-load. This results in any existing porosity in the extended catalyzed layer being substantially filled with liquid to present a solid-liquid phase. Thus, a low flux of hydrogen diffuses through the solid-liquid phase represented by extended anode 17. This results in efficient consumption of hydrogen thus producing a decay profile as shown in FIG. 1.

A decay profile is experienced for oxygen diffusing through membrane 12 from the cathode-membrane interface to the anode-membrane interface. At the extended anode-membrane interface, crossover oxygen encounters a near-zero potential with extended anode catalyst that is electrically connected to anode 16, and likewise is either quantitatively reduced to water or partially to water and peroxide, depending on the catalyst structure, concentration, thickness of extended anode 17 and thickness of membrane 12. However, since the low potential required for both reduction reactions occurs to a larger extent close to the anode/extended anode interface than at the extended anode/membrane interface, crossover oxygen must diffuse well into extended anode 17 before it can partially reduce to form peroxide with high selectivity.

Further, should any peroxide be formed at this location, that is, the interface between anode 16 and extended anode 17, the disconnected catalyst particles of extended anode 17 will advantageously decompose such peroxide to water and oxygen before it can reach membrane 12, especially since the potential of disconnected catalyst particles in extended anode 17 is highest (i.e. most suitable for benign composition of peroxide) near the interface between extended anode 17 and membrane 12.

Figure 2:
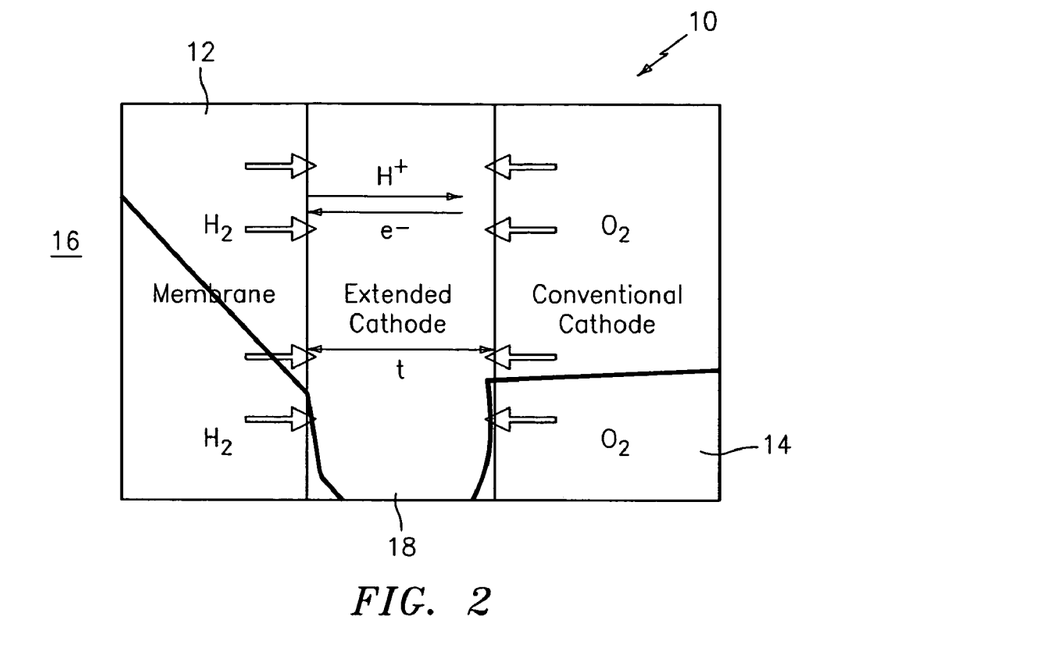
FIG. 2 illustrates a membrane electrode assembly in accordance with the present invention having an extended catalyzed layer between the cathode and the membrane.

FIG. 2 illustrates another embodiment of the invention wherein an extended catalyzed layer or extended cathode 18 is positioned between membrane 12 and cathode 14. Extended cathode 18 advantageously serves to consume oxygen as it diffuses from cathode 14 toward membrane 12, thereby avoiding the possibility of formation of peroxide within the anode and/or extended anode.

FIG. 2 shows oxygen concentration 15 from cathode 14 to extended cathode 18, and also shows hydrogen concentration 13 in membrane 12 and extended cathode 18. A central portion 19 of extended cathode 18 is defined where peroxide is decomposed and/or not generated in accordance with the invention.

Extended cathode 18 can be provided in several forms. In accordance with a preferred embodiment of the present invention extended cathode 18 comprises a portion of catalyst, for example carbon supported platinum particles, the gas pores of which are filled with ion-exchange polymer. Other suitable catalyst includes carbon itself, as well as platinum alloys, preferably platinum-cobalt alloy and platinum-nickel alloy, which may be supported on carbon. Other suitable materials are as set forth above.

At the relatively high potential which is present in the extended cathode, the four electron reduction of oxygen is predominately achieved so as to produce water and not to produce peroxide.

The extended cathode serves to consume such oxygen at high potential, most actively at the interface 20 between extended cathode 18 and cathode 14. Extended cathode 18 further serves to consume hydrogen at the interface 22 between membrane 12 and extended cathode 18. Further, extended cathode 18 also provides for benign decomposition of peroxide at interface 20 and throughout the thickness of extended cathode 18 if peroxide is generated in cathode 14 and at interface 22 and throughout the thickness of extended cathode 18 if peroxide is generated in anode 16. These functions advantageously serve to reduce a significant contributor toward cell degradation, and are therefore advantageous and well suited for use in the environment of the present invention.

Extended cathode 18 can advantageously be substantially electrically connected to cathode 14 through an electrically conducting phase, for example such as carbon support material, so as to ensure high potential and, therefore, consumption of crossover oxygen to produce water.

Extended cathode 18 further preferably has substantially no porosity and a relatively high inherent oxygen reduction rate. This will result in a maximized ratio of oxygen reduction rate to oxygen diffusion rate, and thereby will minimize oxygen escape from the extended cathode and crossover rate to the anode.

In this regard, extended cathode 18 advantageously has a porosity of less than about 30%, and is preferably substantially non-porous. Oxygen reduction activity per unit platinum surface area for extended cathode 18 is also advantageously approximately the same as the cathode because of electrical connectivity to the cathode.

Any porosity of extended cathode 18 may advantageously be flooded during operation, for example with water, so as to reduce the oxygen diffusion rate therethrough. To this end, the pores of extended cathode 18 can be treated or otherwise provided with an affinity toward the flooding liquids, for example water.

Provision of an extended cathode 18 having these properties advantageously results in efficient oxygen consumption at interface 20 and throughout extended cathode 18 and, therefore, extended membrane life as compared to other types of membrane electrode assemblies.

Figure 3:
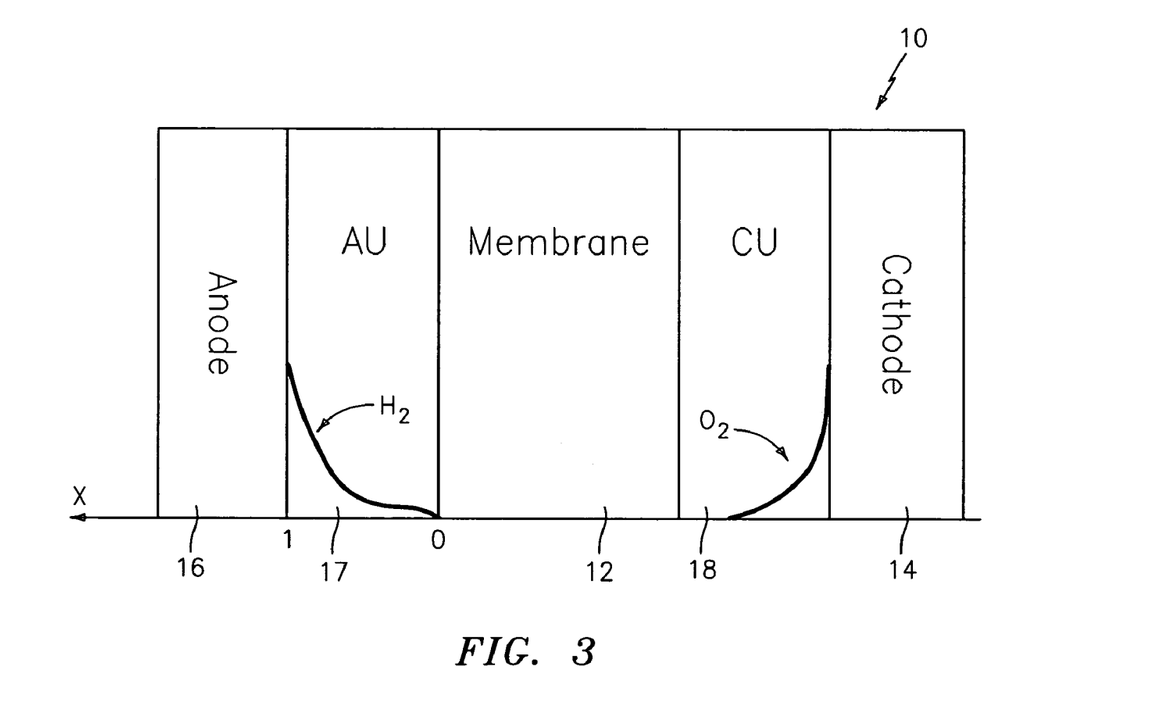
FIG. 3 illustrates a membrane electrode assembly in accordance with the present invention having an extended catalyzed layer between the anode and the membrane and between the cathode and the membrane.

FIG. 3 illustrates a further embodiment of the present invention which includes two extended catalyzed layers, namely an extended anode 17 and an extended cathode 18. As will be discussed below, this embodiment provides excellent protection from peroxide mediated decomposition of the membrane, and is well suited to a cell that may be operated using reformate fuel, as one non-limiting example.

FIG. 3 shows an assembly 10 including membrane 12, cathode 14 and anode 16, as well as extended anode 17 positioned between anode 16 and membrane 12 and extended cathode 18 positioned between cathode 14 and membrane 16.

In this configuration, it is preferred to provide a proportion of disconnected catalyst particles in extended anode 17 which is greater than the proportion of disconnected particles in extended cathode 18. This advantageously serves to minimize the flux of any peroxide which may be generated at the anode side back toward membrane 12.

Further, and as demonstrated below, this configuration maximizes protection for membrane 12 by greatly reducing crossover of both hydrogen and oxygen, and by benignly decomposing any peroxide which is formed at anode 16 within extended anode 17 and/or formed at the cathode 14 within extended cathode 18.

It should be noted that the subject matter of the present invention can advantageously be utilized in connection with various membranes including but not limited to reinforced membranes. The reinforced membranes can include membranes having mechanical reinforcements, examples of which include but are not limited those disclosed in U.S. Pat. Nos. 5,795,668, 6,485,856 and 6,613,203.

Extended catalyzed layers such as extended anode 17 and extended cathode 18 can advantageously be provided as a porous, partially electrically connected and ionically conductive structure having a porosity of between about 0% and about 30%. The catalyst particles can be present in an amount between about 5 and about 50% vol based upon volume of the layer. Ionomer is also present in an amount between about 5 and about 95% vol. based upon volume of the layer. The extended catalyzed layer can be provided having particles selected from various materials, preferably selected from the group consisting of particles of carbon, particles of platinum and platinum alloy, and combinations thereof.

Fluoride-emission rates from a fuel cell are indicative of membrane degeneration, including degradation due to exposure to free radicals generated from peroxide. Measurements of reduced fluoride emission can demonstrate protection of the membrane from degeneration.

In order to demonstrate effectiveness of the present invention, F-emission rates were measured from fuel cells incorporating the extended catalyzed layers of the present invention as compared to baseline fuel cells with no extended catalyzed layer(s). Fluoride emission rates are indicative of chemical attack rates of the polymer, and are measured by fluoride analysis of condensed reactant gases at the effluent of the fuel cell.

Figure 4:
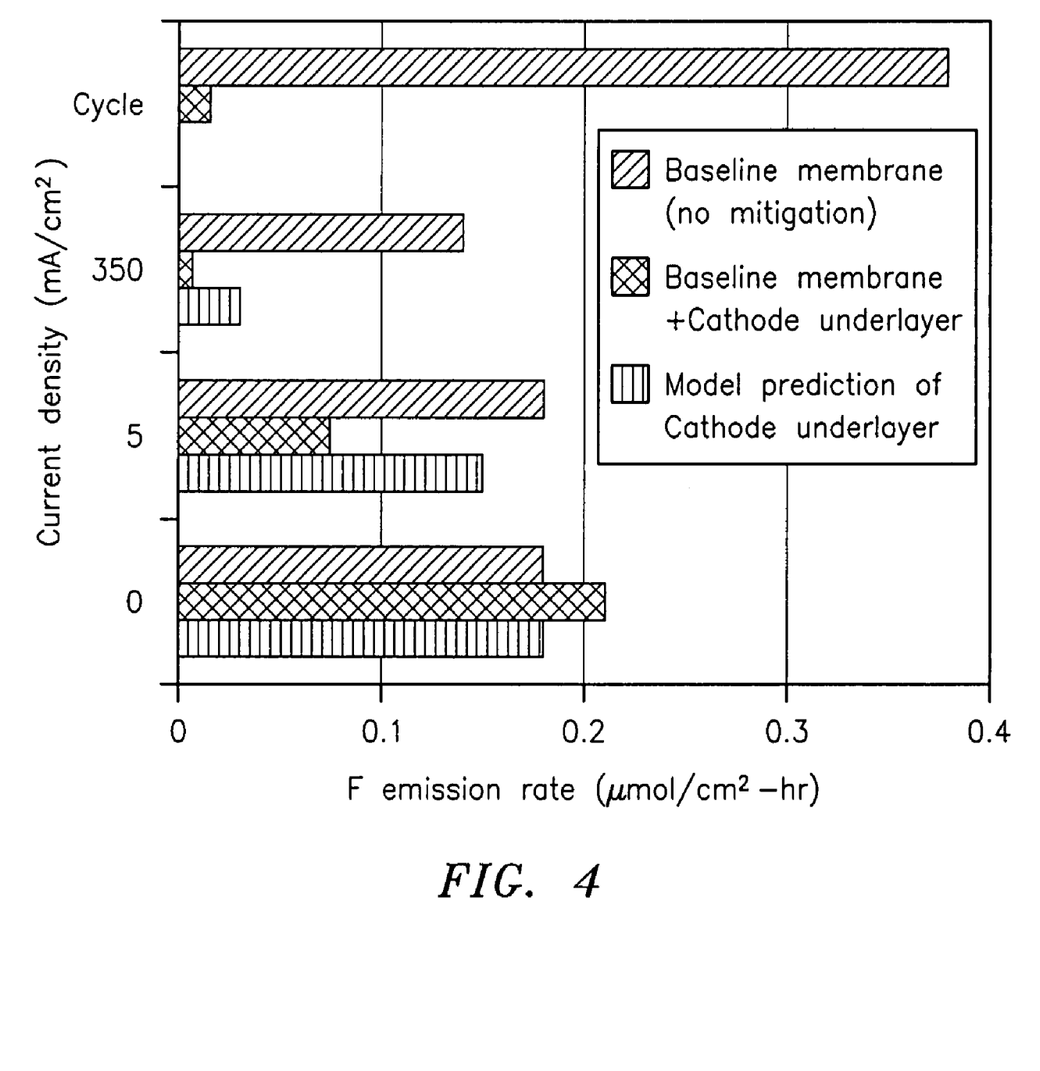
FIG. 4 illustrates fluoride emission rates for a baseline membrane, as well as prediction model and actual test results for a membrane electrode assembly having a cathode side extended catalyzed layer.

FIG. 4 shows fluoride emission data for a baseline membrane with no extended catalyzed layer and for a membrane having an extended cathode as in the embodiment of FIG. 2. FIG. 4 shows that, at increasing current densities, the extended cathode provided a dramatic reduction in fluoride emissions, this indicating successful protection of the fluorine-containing membrane from attack during operation. The data shown was obtained using a predictive model and also from actual testing. This data clearly shows that at higher current densities, for example above 5 mA/cm$^2$, and especially at 350 mA/cm$^2$ and higher, the extended cathode is providing substantial protection to the membrane. Also shown in FIG. 4, the extended cathode structure provides protection from degradation of the membrane in the "cycle" condition, which represents transient operation of a fuel cell that is known to accelerate degeneration of the membrane.

Figure 5:
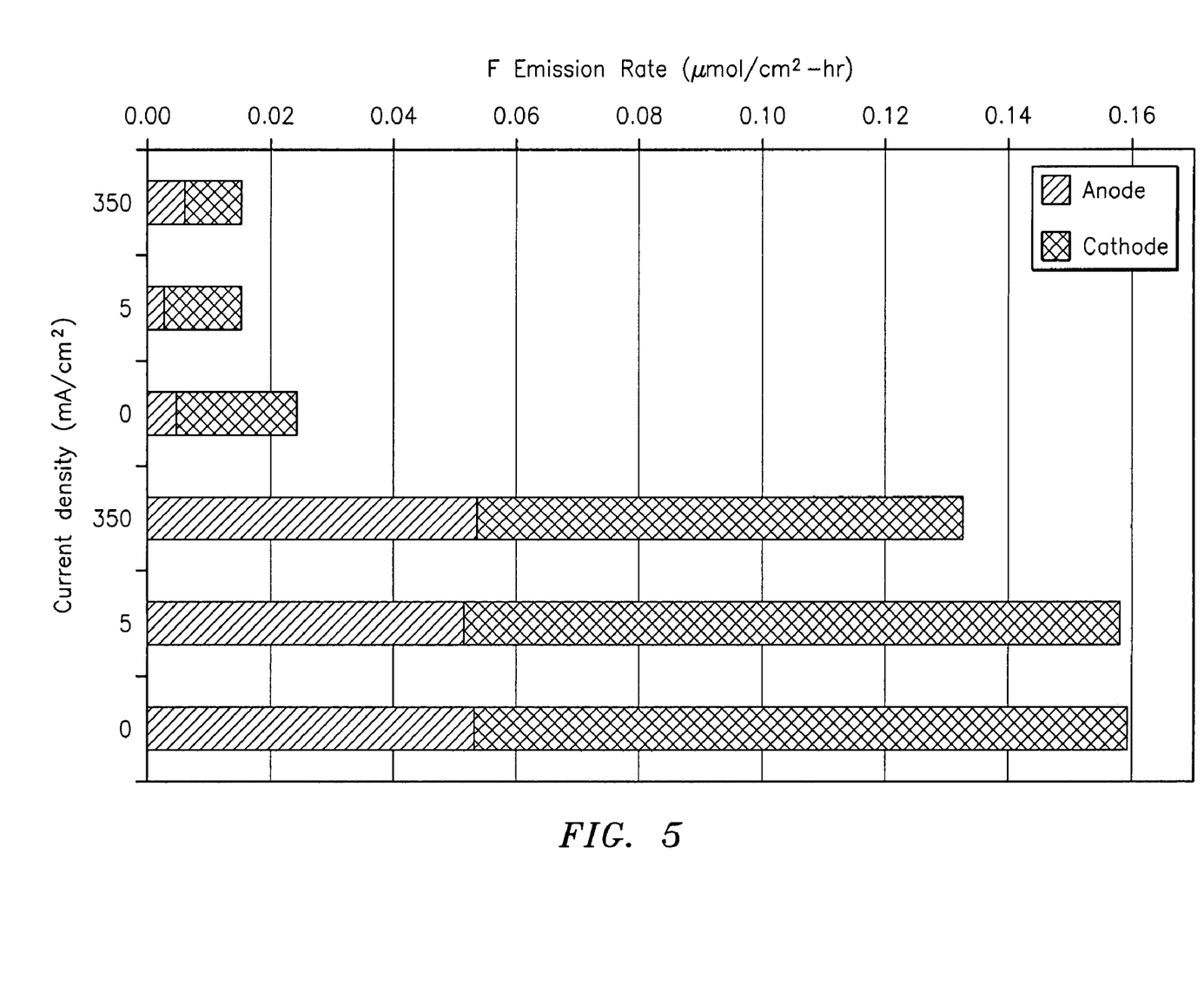
FIG. 5 illustrates fluoride emission rates for a baseline membrane and a membrane electrode assembly having an anode side extended catalyzed layer.

FIG. 5 shows results obtained from testing the baseline fuel cell and also from testing a fuel cell with an extended anode (i.e. the embodiment described by FIG. 1). This data shows that fluoride emissions are dramatically reduced for any current density. This data was gathered under "wet decay" conditions, including a temperature of 90° C., a relative humidity of 100%, and a flow of hydrogen and oxygen.

Figure 6:
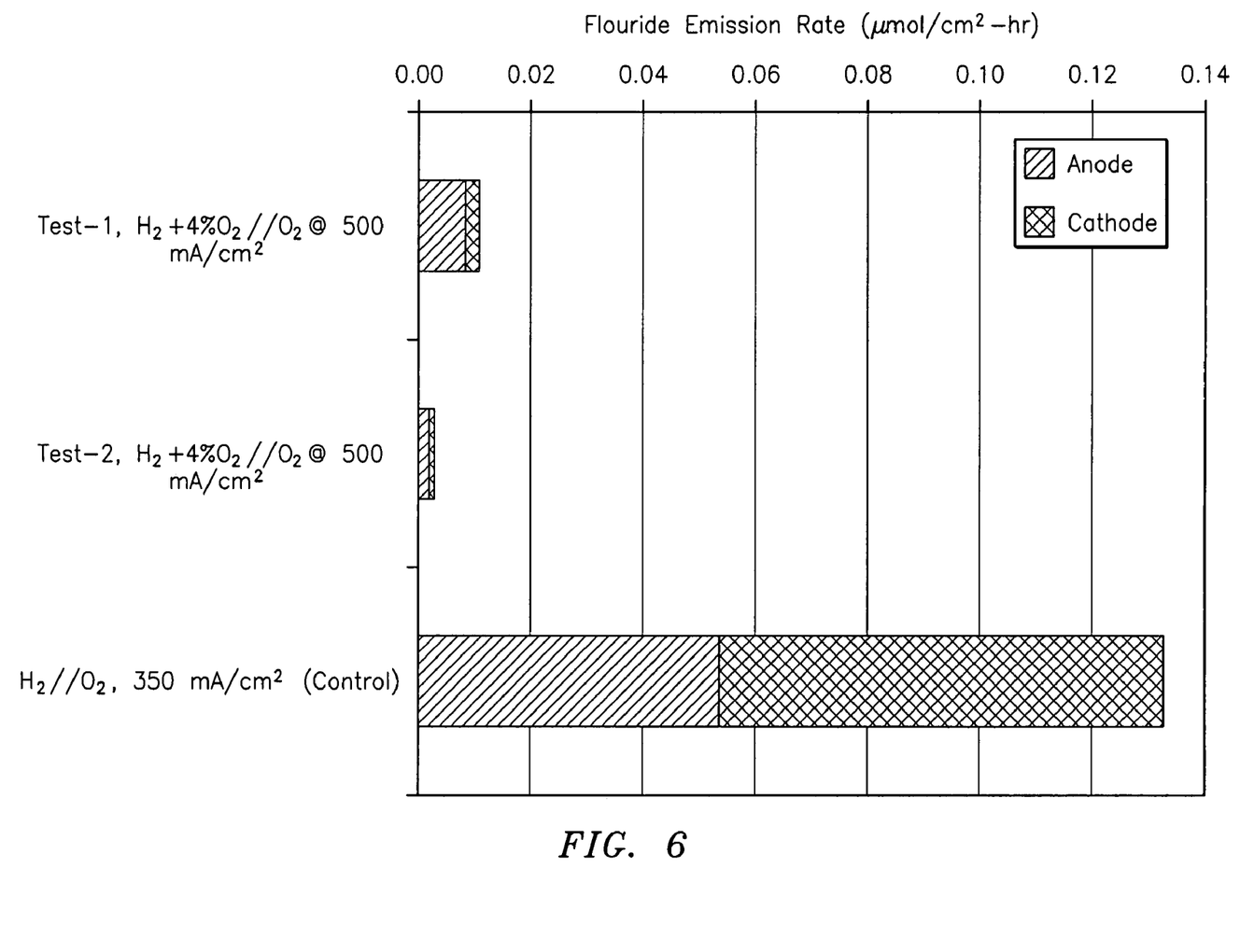
FIG. 6 illustrates fluoride emission rates for a baseline membrane and a membrane electrode assembly having both anode side and cathode side extended catalyzed layers.

Turning now to FIG. 6, this figure shows results obtained from evaluating an apparatus according to the invention having both an extended anode and an extended cathode (i.e. the embodiment described by FIG. 3). This, too is compared to a baseline fuel cell which included neither extended anode nor extended cathode layers. In this comparison, the protected fuel cell was operated at more extreme conditions than the baseline, which would have accelerated any attack, and yet FIG. 6 shows that the fuel cell protected with both extended catalyzed layers is very effective at preventing decay of the fuel cell through erosion of the membrane.

It should be noted that there has been provided in accordance with the present invention a solution to the problem of oxygen and hydrogen crossover from the cathode and anode, respectively, in the form of an extended catalyzed layer which can advantageously be positioned to reduce oxygen crossing over through the cathode and form water, or to oxidize hydrogen crossing over through the anode. This is particularly advantageous in that such crossover oxygen is consumed and removed without forming the peroxide which is known to lead to degradation of the membrane. In addition, the invention provides for efficient benign decomposition of any remnant peroxide that forms within the fuel cell.

It is apparent that there has been provided in accordance with the present invention a membrane electrode assembly wherein hydrogen crossover from the anode is minimized, as is oxygen crossover from the cathode, and peroxide is therefore mostly prevented from forming. Further, should peroxide form at all, it is decomposed in benign fashion. This fully satisfies the objects, means, and advantages set forth previously herein.

While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. A membrane electrode assembly, comprising:
   an anode;
   a cathode;
   a membrane disposed between the anode and the cathode; and
   an extended catalyzed layer between the membrane and at least one electrode of the anode and the cathode, the extended catalyzed layer comprising catalyst particles embedded in membrane material and including a first plurality of particles which are electrically connected to the at least one electrode and a second plurality of particles which are electrically disconnected from the at least one electrode.

2. The assembly of claim 1, wherein the extended catalyzed layer is positioned between the anode and the membrane.

3. The assembly of claim 2, wherein the extended catalyzed layer has a latent hydrogen oxidation rate for electrically connected particles which is substantially the same as the anode.

4. The assembly of claim 1, wherein the extended catalyzed layer is positioned between the cathode and the membrane.

5. The assembly of claim 4, wherein the extended catalyzed layer has a latent oxygen reduction rate which is substantially the same or greater than the cathode.

6. The assembly of claim 1, wherein the extended catalyzed layer comprises an extended anode layer between the anode and the membrane, and wherein the assembly further comprises an extended cathode layer between the cathode and the membrane.

7. The assembly of claim 6, wherein the extended anode layer contains a greater fraction of electrically disconnected particles than the extended cathode layer.

8. The assembly of claim 1, wherein the particles are selected from the group consisting of particles of carbon, particles of platinum, particles of platinum alloy and combinations thereof.

9. The assembly of claim 8, wherein the particles are supported on carbon.

10. The assembly of claim 8, wherein the particles are platinum alloy selected from the group consisting of platinum-cobalt alloy, platinum-nickel alloy and combinations thereof.

11. The assembly of claim 1, wherein the extended catalyzed layer has a porosity of less than 30%.

12. The assembly of claim 11, wherein the extended catalyzed layer is substantially non-porous.

13. The assembly of claim 11, wherein any porosity of the extended catalyzed layer is filled with liquid during operation.

14. The assembly of claim 1, wherein the extended catalyzed layer is a porous electrically connected and ionically conductive structure having a porosity of between about 0% and about 30%, wherein the catalyst is present in an amount between about 5 and about 50% vol based upon volume of the layer, and ion-exchange material is present in an amount between about 5 and about 95% vol based upon volume of the layer.

15. The assembly of claim 1, wherein the extended catalyzed layer has a porosity which is less than a porosity of the at least one electrode.

* * * * *